United States Patent
Matsueda et al.

(10) Patent No.: US 10,118,666 B2
(45) Date of Patent: Nov. 6, 2018

(54) BICYCLE HYDRAULIC DEVICE

(71) Applicant: Shimano Inc., Osaka (JP)

(72) Inventors: Keiji Matsueda, Osaka (JP); Yusuke Nishikawa, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 58 days.

(21) Appl. No.: 15/418,484

(22) Filed: Jan. 27, 2017

(65) Prior Publication Data
US 2018/0215441 A1    Aug. 2, 2018

(51) Int. Cl.
*F16D 25/08* (2006.01)
*B62L 3/02* (2006.01)
*B62K 23/06* (2006.01)

(52) U.S. Cl.
CPC ............ *B62L 3/023* (2013.01); *B62K 23/06* (2013.01)

(58) Field of Classification Search
CPC ....... B61H 15/00; F16D 55/224; B60T 11/22; B60T 11/30; B60T 17/222
USPC ........ 188/24.11, 26, 151 R, 344, 196 A, 352
See application file for complete search history.

(56) References Cited

U.S. PATENT DOCUMENTS

| | | | | |
|---|---|---|---|---|
| 3,658,391 | A * | 4/1972 | Hensley | B60T 11/323 137/118.03 |
| 6,193,030 | B1 * | 2/2001 | Kuo | B62L 1/00 188/344 |
| 7,412,829 | B2 * | 8/2008 | Matsushita | B60T 11/22 60/453 |
| 9,090,303 | B2 | 7/2015 | Fukao et al. | |
| 2006/0169009 | A1 * | 8/2006 | Niedrig | B60R 25/00 70/186 |
| 2011/0000749 | A1 * | 1/2011 | Yamashita | B60T 7/102 188/71.1 |
| 2012/0079910 | A1 * | 4/2012 | Wehage | B62K 21/12 74/551.1 |
| 2012/0124991 | A1 * | 5/2012 | Thomas | B60T 7/102 60/547.1 |
| 2013/0068577 | A1 * | 3/2013 | Kuan | B60T 11/30 188/369 |
| 2014/0231202 | A1 * | 8/2014 | Shih | B62L 3/023 188/344 |
| 2016/0347301 | A1 * | 12/2016 | Gallagher | B60T 17/222 |
| 2018/0128325 | A1 * | 5/2018 | Ruopp | B60T 11/16 |

* cited by examiner

*Primary Examiner* — Christopher P Schwartz
(74) *Attorney, Agent, or Firm* — Global IP Counselors, LLP

(57) ABSTRACT

A bicycle hydraulic device is basically provided with a base member, a first plug and a second plug. The base member has a hydraulic fluid passageway, a first opening communicating with the hydraulic fluid passageway and a second opening communicating with the hydraulic fluid passageway. The first plug is disposed in the first opening, and having a receiving hole. The second plug is disposed in the second opening. The second plug has a protrusion extending into the receiving hole of the first plug to couple the first and second plugs to the base member.

20 Claims, 13 Drawing Sheets

BICYCLE HYDRAULIC DEVICE

BACKGROUND

Field of the Invention

This invention generally relates to a bicycle hydraulic device. More specifically, the present invention relates to a bicycle hydraulic device having a hydraulic fluid passageway.

Background Information

Some bicycles are provided with one or more hydraulically operated components. For example, some bicycles are provided with a hydraulic braking system. The hydraulic braking system typically includes at least one hydraulic brake operating device (i.e., a hydraulic actuating device) and at least one hydraulic brake device (i.e., a hydraulically actuated device). The hydraulic brake operating device typically includes a master piston that is slidably disposed in a cylinder bore of a master cylinder, and a brake lever actuating the master piston. The master cylinder contains a hydraulic fluid. The cylinder bore of the master cylinder is in fluid communication with a disc brake caliper housing in the case of a hydraulic disc brake (i.e., a hydraulically actuated device) via a fluid conduit. Brake pads of a caliper housing of the hydraulic disc brake are typically spaced apart from a rotor by a predetermined gap. The movement of fluid into the caliper housing causes the pistons in the caliper housing to move, and eventually brings the brake pads into contact with a rotor.

SUMMARY

Generally, the present disclosure is directed to various features of a bicycle hydraulic device (e.g., a hydraulic actuating device or a hydraulically actuated device). The bicycle hydraulic device has a hydraulic fluid passageway for conveying hydraulic fluid. The configuration of the hydraulic fluid passageway can be limited depending on configuration and/or parts of the bicycle hydraulic device One aspect presented in this disclosure is to provide a bicycle hydraulic device that is configured such that a hydraulic fluid passageway can be formed so as to conserve space and/or eliminate parts for conveying hydraulic fluid.

In view of the state of the known technology and in accordance with a first aspect of the present disclosure, a bicycle hydraulic device is basically provided that comprises a base member, a first plug and a second plug. The base member has a hydraulic fluid passageway, a first opening communicating with the hydraulic fluid passageway and a second opening communicating with the hydraulic fluid passageway. The first plug is disposed in the first opening, and having a receiving hole. The second plug is disposed in the second opening. The second plug has a protrusion extending into the receiving hole of the first plug to couple the first and second plugs to the base member.

Advantageously according to the first aspect of the present invention, a hydraulic fluid passageway can be easily manufactured in a bicycle hydraulic device.

In accordance with a second aspect of the present invention, the bicycle hydraulic device according to the first aspect is configured so that the receiving hole of the first plug includes an internal thread and the protrusion of the second plug includes an external thread that is threadedly engaged with the internal thread.

Advantageously according to the second aspect of the present invention, the first and second plugs can be easily secured to the base member.

In accordance with a third aspect of the present invention, the bicycle hydraulic device according to the first or second aspect is configured so that the protrusion of the first plug is bonded within the receiving hole of the second plug by a bonded connection therebetween.

Advantageously according to the third aspect of the present invention, the first and second plugs can be easily secured to the base member in a permanent manner.

In accordance with a fourth aspect of the present invention, the bicycle hydraulic device according to any one of the first to third aspects further comprises a first seal disposed between the first plug and the base member, and a second seal disposed between the second plug and the base member.

Advantageously according to the fourth aspect of the present invention, the first and second openings in the base member can be sealed stably.

In accordance with a fifth aspect of the present invention, the bicycle hydraulic device according to any one of the first to fourth aspects is configured so that the first opening defines a first insert axis along which the first plug is inserted, the second opening defines a second insert axis along which the second plug is inserted.

Advantageously according to the fifth aspect of the present invention, the first and second plugs can be arranged along axes that either intersect or are coaxial.

In accordance with a sixth aspect of the present invention, the bicycle hydraulic device according to the fifth aspect is configured so that the first and second insert axes form an angle therebetween.

Advantageously according to the sixth aspect of the present invention, the hydraulic fluid passageway can be formed with an angled portion.

In accordance with a seventh aspect of the present invention, the bicycle hydraulic device according to the fifth aspect is configured so that the first and second insert axes are coaxial.

Advantageously according to the seventh aspect of the present invention, the hydraulic fluid passageway can be formed with an angled portion.

In accordance with an eighth aspect of the present invention, the bicycle hydraulic device according to the fifth aspect is configured so that the first and second openings are arranged such that at least one of the first and second insert axes is different from a fluid flow direction.

Advantageously according to the eighth aspect of the present invention, the fluid flow will not press the at least one of the first and second plugs along one of the first and second insert axes in an actuated state where the bicycle hydraulic device is actuated by user or rider.

In accordance with a ninth aspect of the present invention, the bicycle hydraulic device according to the eighth aspect is configured so that the first and second openings are arranged such that the first and second insert axes both are perpendicular to the fluid flow direction.

Advantageously according to the ninth aspect of the present invention, the hydraulic fluid passageway can be formed with a corner via the first and second openings.

In accordance with a tenth aspect of the present invention, the bicycle hydraulic device according to any one of the first to fourth aspects is configured so that the hydraulic fluid passageway includes a first fluid channel having a first center axis and a second fluid channel having a second center axis. The first and second center axes of the first and second fluid channels intersect to form an angle therebetween. The first plug includes a slanted surface that is disposed in the hydraulic fluid passageway at an intersection of the first and second fluid channels, the slanted surface is angled with respect to the first and second center axes.

Advantageously according to the tenth aspect of the present invention, the hydraulic fluid passageway can be formed with an angled corner between the first and second fluid channels.

In accordance with an eleventh aspect of the present invention, the bicycle hydraulic device according to the tenth aspect further comprises a third plug and a fourth plug. The third plug is disposed in a third opening of the base member which communicates with the hydraulic fluid passageway. The third plug has a receiving hole. The fourth plug is disposed in a fourth opening of the base member which communicates with the hydraulic fluid passageway. The fourth plug has a protrusion extending into the receiving hole of the third plug to couple the third and fourth plugs to the base member.

Advantageously according to the eleventh aspect of the present invention, the hydraulic fluid passageway can be formed with a complex fluid flow path.

In accordance with a twelfth aspect of the present invention, the bicycle hydraulic device according to the eleventh aspect is configured so that the hydraulic fluid passageway includes a third fluid channel having a third center axis. The second and third center axes of the second and third fluid channels intersect to form an angle therebetween. The third and fourth plugs are disposed at an intersection of the second and third fluid channels to divide the hydraulic fluid passageway into two fluid flow branches.

Advantageously according to the twelfth aspect of the present invention, the second and third fluid channels can be easily connected inside the base member.

In accordance with a thirteenth aspect of the present invention, the bicycle hydraulic device according to any one of the first to twelfth aspects is configured so that the base member includes a main body that includes the hydraulic fluid passageway. The main body is made of a non-metallic material.

Advantageously according to the thirteenth aspect of the present invention, the bicycle hydraulic device can be made relatively lightweight and relatively inexpensively.

In accordance with a fourteenth aspect of the present invention, the bicycle hydraulic device according to any one of the first to thirteenth aspects is configured so that the first and second plugs are each made of a non-metallic material.

Advantageously according to the fourteenth aspect of the present invention, the first and second plugs do not increase the weight of the base member.

In accordance with a fifteenth aspect of the present invention, the bicycle hydraulic device according to any one of the first to fourteenth aspects is configured so that the base member includes a cylinder bore in which a piston is movably disposed. The hydraulic fluid passageway includes a first fluid channel and a second fluid channel. The first fluid channel fluidly connects the cylinder bore and the second fluid channel.

Advantageously according to the fifteenth aspect of the present invention, the bicycle hydraulic device can be used as either a hydraulic actuating device or a hydraulically actuated device.

In accordance with a sixteenth aspect of the present invention, the bicycle hydraulic device according to the fifteenth aspect is configured so that the cylinder bore has a cylinder axis. The first fluid channel has a first center axis. The second fluid channel has a second center axis that is substantially parallel to the cylinder axis.

Advantageously according to the sixteenth aspect of the present invention, the bicycle hydraulic device can be relatively compact.

In accordance with a seventeenth aspect of the present invention, the bicycle hydraulic device according to the sixteenth aspect is configured so that the first center axis extends substantially perpendicular between the second center axis and the cylinder axis.

Advantageously according to the seventeenth aspect of the present invention, the bicycle hydraulic device can be relatively compact.

In accordance with an eighteenth aspect of the present invention, the bicycle hydraulic device according to any one of the first to seventeenth aspects is configured so that the bicycle hydraulic device further comprises an operating member movably mounted to the base member that includes a cylinder bore so as to move a piston disposed in the cylinder bore in response to a movement of the operating member. The hydraulic fluid passageway is fluidly connected to the cylinder bore.

Advantageously according to the eighteenth aspect of the present invention, the bicycle hydraulic device can be used as a hydraulic actuating device.

In accordance with a nineteenth aspect of the present invention, the bicycle hydraulic device according to the eighteenth aspect is configured so that the base member includes a proximal portion configured to be attached to a bicycle handlebar, a distal portion, and a grip portion arranged between the proximal portion and the distal portion. The operating member is mounted on the distal portion.

Advantageously according to the nineteenth aspect of the present invention, the bicycle hydraulic device can be mounted to a curved section of a drop handlebar.

In accordance with a twentieth aspect of the present invention, the bicycle hydraulic device according to any one of the first to seventeenth aspects is configured so that the base member is a caliper housing that includes a piston receiving cavity in which a piston is movably disposed to move a brake pad. The hydraulic fluid passageway is fluidly connected to the piston receiving cavity.

Advantageously according to the twentieth aspect of the present invention, the bicycle hydraulic device can be used as a hydraulically actuated device.

Also other objects, features, aspects and advantages of the disclosed bicycle hydraulic devices will become apparent to those skilled in the art from the following detailed description, which, taken in conjunction with the annexed drawings, discloses selected embodiments of the bicycle hydraulic devices.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
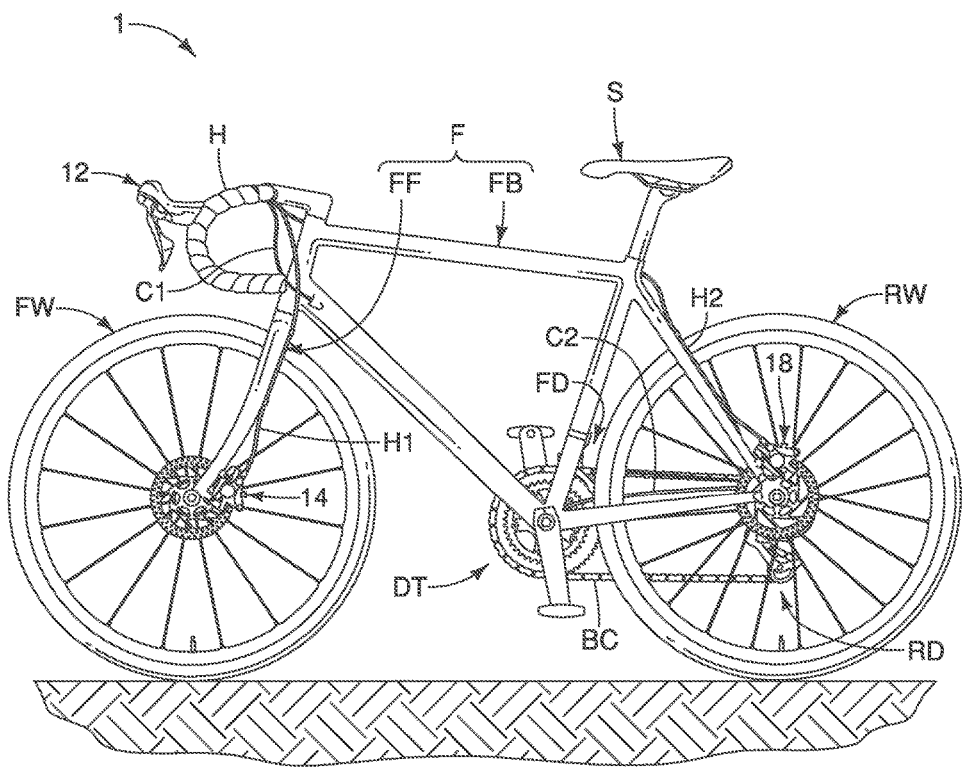
FIG. 1 is a side elevational view of a bicycle having a pair of bicycle hydraulic braking systems that are each equipped with a bicycle hydraulic actuating device (i.e., a bicycle hydraulic device) and a bicycle hydraulically actuated device (i.e., a bicycle hydraulic device) in accordance with one illustrated embodiment.

Referring initially to FIG. 1, a bicycle 1 is illustrated that is equipped with a pair of bicycle hydraulic braking systems in accordance with one illustrative embodiment. The bicycle 1 basically includes a frame F, a front wheel FW, a rear wheel RW, a bicycle handlebar H and a seat or saddle S. The frame F includes a diamond-shaped frame body FB and a front fork FF. The front fork FF is pivotally mounted to a front portion of the frame body FB to pivot about an inclined axis. The handlebar H is a drop handlebar that is fixed to an upper end of the front fork FF in a conventional manner such as with a handlebar stem. The front wheel FW is rotatably mounted to a lower end of the front fork FF in a conventional manner, while the rear wheel RW is rotatably mounted to a rear portion of the frame body FB in a conventional manner. The bicycle 1 further includes a pedal-operated chain drive train IDT for propelling the bicycle in a conventional manner. The bicycle 1 further includes a front derailleur FD and a rear derailleur RD for shifting a bicycle chain BC between gears of the pedal-operated chain drive train DT in a conventional manner. Because most of the components of the bicycle 1 are conventionally known in the bicycler field, details relating to the components of the bicycle 1 are not described or illustrated herein, except for components pertinent to the present invention as described hereinafter.

As seen in FIG. 1, the bicycle 1 further includes a front shift/brake operating device 12 and a front hydraulic disc brake caliper 14. The front shift/brake operating device 12 is mounted on the left-hand side of the handlebar H in a conventional manner, while the front hydraulic disc brake caliper 14 is mounted on the front fork FF in a conventional manner. The front shift/brake operating device 12 is configured to operate the front derailleur FI) via a conventional control cable C1 and the front hydraulic disc brake caliper 14 via a hydraulic hose H1. The control cable C1 acts as a shift cable that connects the front shift/brake operating device 12 to the front derailleur FD. The control cable C1 is preferably a Bowden cable having an inner cable and an outer casing. The front hydraulic disc brake caliper 14 is actuated by hydraulic fluid pressure in response to operation of the front shift/brake operating device 12. The front shift/brake operating device 12 and the front hydraulic disc brake caliper 14 are examples of bicycle hydraulic devices that are constructed in accordance with the present invention as discussed below.

Figure 2:
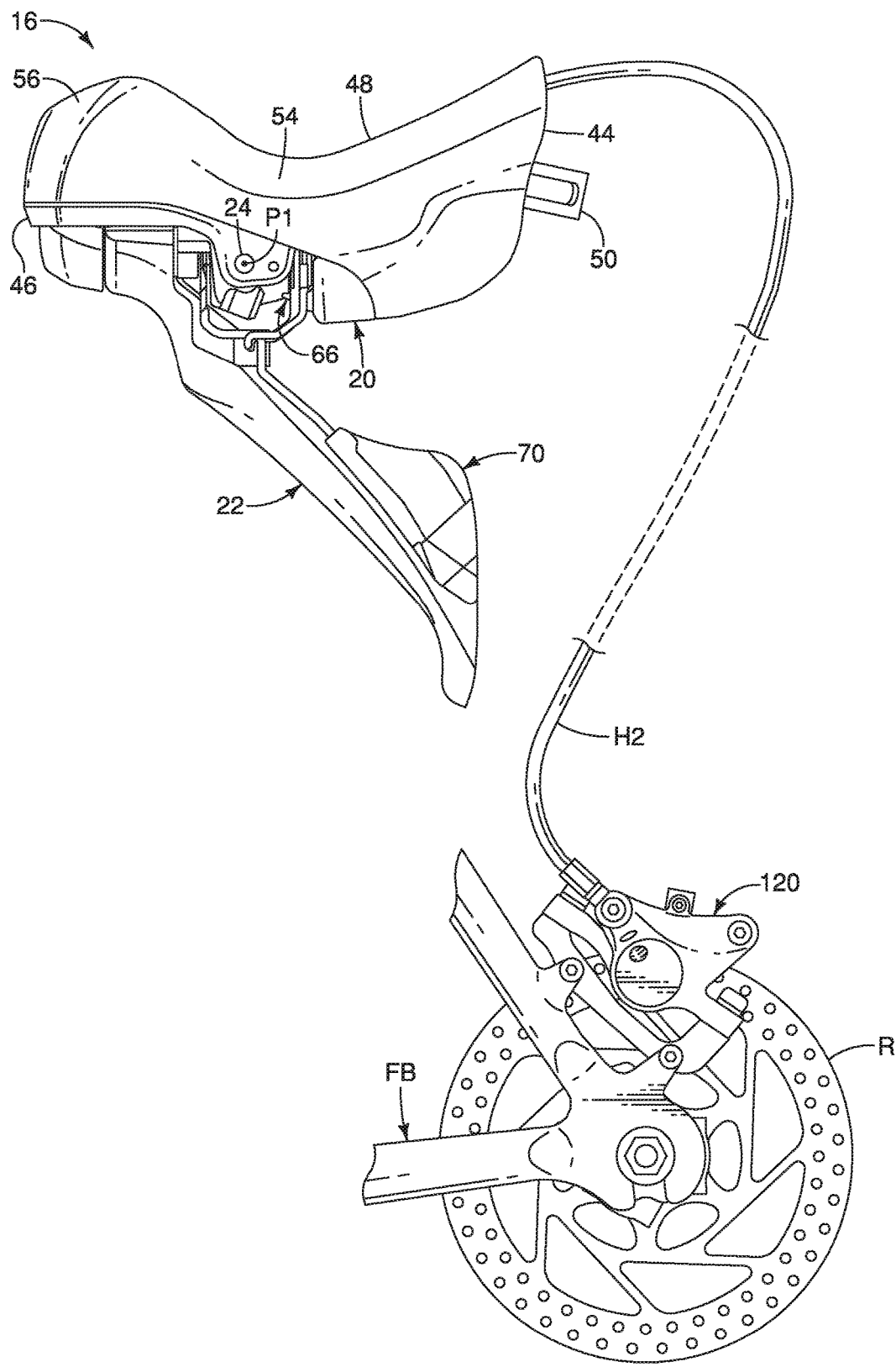
FIG. 2 is an enlarged elevational view of a portion of the bicycle hydraulic braking system for applying a braking force to a rear wheel of the bicycle illustrated in FIG. 1.

As seen in FIG. 2, the bicycle 1 further includes a rear shift/brake operating device 16 and a rear hydraulic disc brake caliper 18. The rear shift/brake operating device 16 is mounted on a right-hand side of the handlebar II in a conventional manner, while the rear hydraulic disc brake 18 is mounted on a rear part of the frame body FB in a conventional manner. The rear shift/brake operating device 16 is configured to operate the rear derailleur RD via a control cable C2 and the rear hydraulic disc brake caliper 18 via a hydraulic hose H2. The control cable C2 acts as a shift cable that connects the rear shift/brake operating device 16 to the rear derailleur RD. The control cable C2 is preferably a Bowden cable having an inner cable and an outer casing. The rear hydraulic disc brake caliper 18 is actuated by hydraulic fluid pressure in response to operation of the rear shift/brake operating device 16. The rear shift/brake operating device 16 and the rear hydraulic disc brake caliper 18 are examples of bicycle hydraulic devices that are constructed in accordance with the present invention as discussed below.

The front and rear shift/brake operating devices 12 and 16 are basically identical to each other except that they are mirror images of each other and they are configured with a different number of gear shifting positions. Also, the front and rear hydraulic disc brake calipers 14 and 18 are identical to each other. Thus, for the sake of brevity, the front shift/brake operating device 12 and the front hydraulic disc brake caliper 14 will not be further discussed or illustrated herein. Rather, the operation and construction of the front shift/brake operating device 12 and the front hydraulic disc brake caliper 14 can be understood from the following description of the rear shift/brake operating device 16 and the rear hydraulic disc brake caliper 18.

Figure 3:
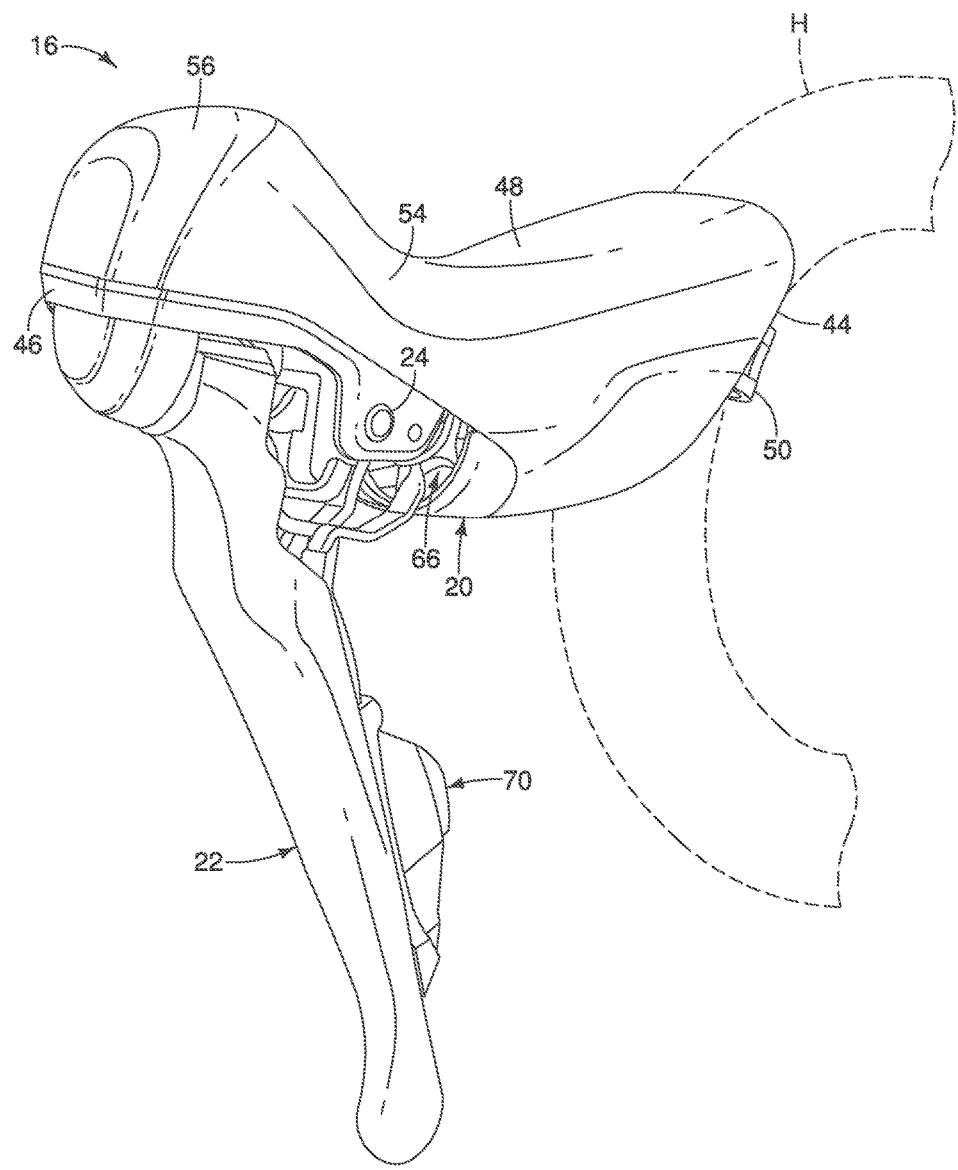
FIG. 3 is a perspective view of the bicycle hydraulic actuating device for actuating the bicycle hydraulically actuated device to apply the braking force to the rear wheel of the bicycle illustrated in FIG. 1.
Figure 4:
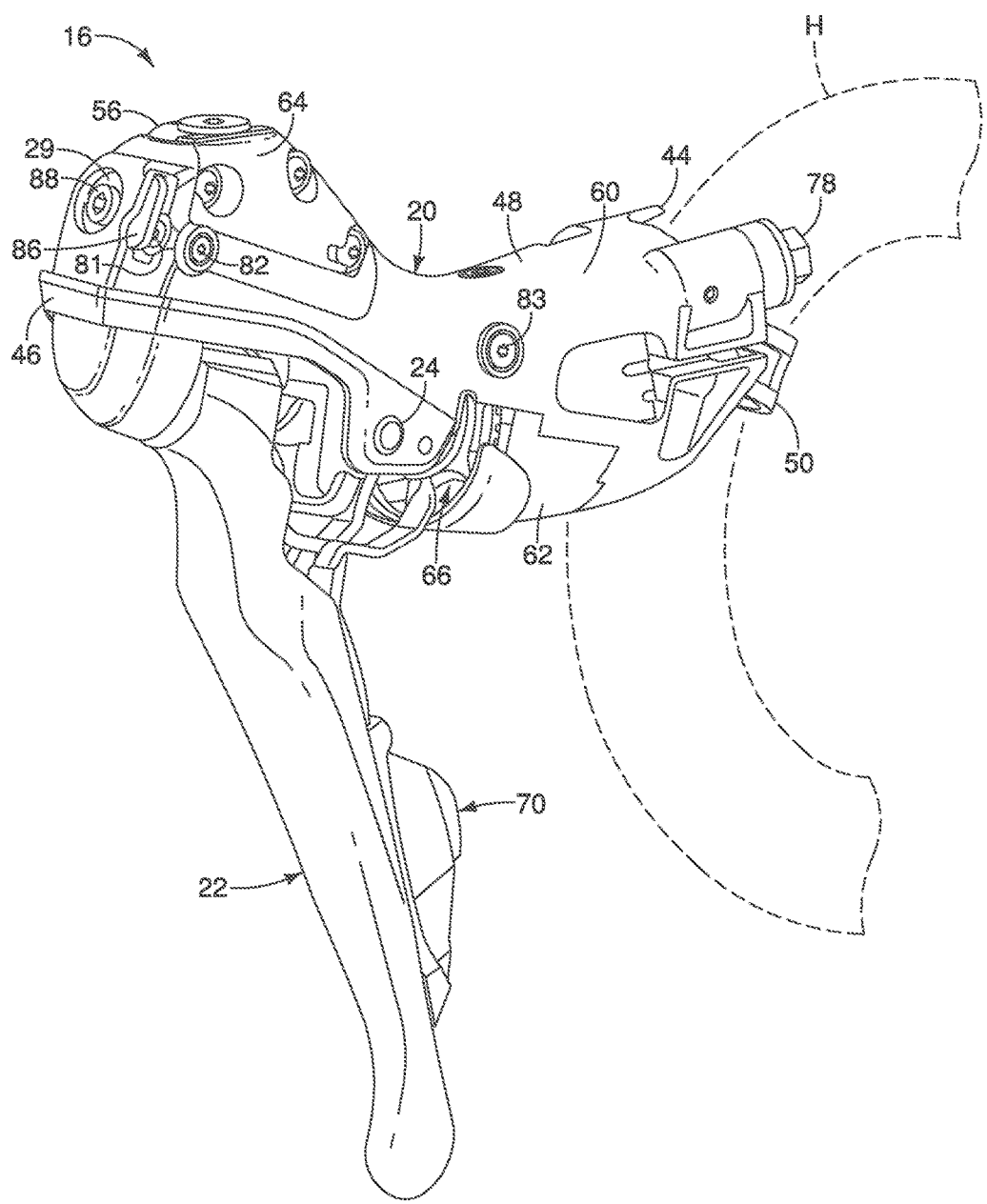
FIG. 4 is a perspective view of the bicycle hydraulic actuating device illustrated in FIG. 3 with the grip cover removed.
Figure 5:
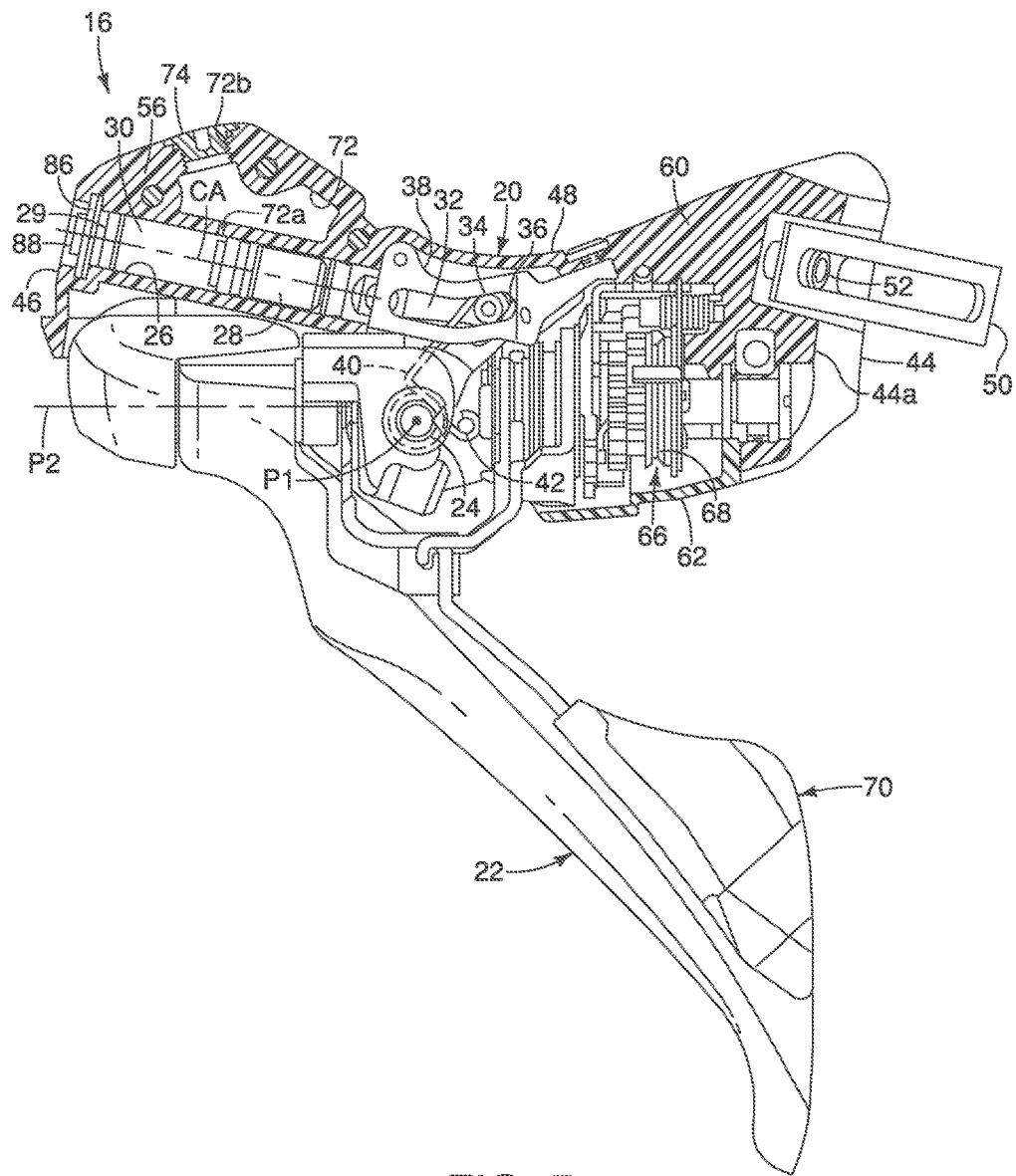
FIG. 5 is an elevational view of the bicycle hydraulic device illustrated in FIGS. 3 and 4 with the base member being shown in cross section.

Turning now to FIGS. 3 to 5, the rear shift/brake operating device 16 will now be discussed in further detail. In the illustrated embodiment, the rear shift/brake operating device 16 includes both a shifting function and a braking function Thus, the rear shift/brake operating device 16 is also known as a bicycle brifter. While the rear shift/brake operating device 16 includes both a shifting function and a braking function, the following description of the rear shift/brake operating device 16 will primarily focus on the braking function. Accordingly, the rear shift/brake operating device 16 can be reconfigured without the shifting function if needed and/or desired.

In the illustrated embodiment, as seen in FIGS. 3 to 6, the rear shift/brake operating device 16 (i.e., a bicycle hydraulic device) comprises a base member 20. The base member 20 is configured to be mounted to a curved section of the handlebar H as seen in FIGS. 3 and 4. Here, the rear shift/brake operating device 16 (the bicycle hydraulic device) further comprises an operating member 22 movably mounted to the base member 20. Specifically, the operating member 22 is a first operating lever that is pivotally mounted to the base member 20 by a pivot pin 24 to pivot about a pivot axis P1 (FIG. 5) to perform a braking operation. Here, the operating member 22 is an elongated lever that has a first end pivotally mounted to the base member 20 by the pivot pin 24 and a second end extending outwardly from the base member 20.

Figure 6:
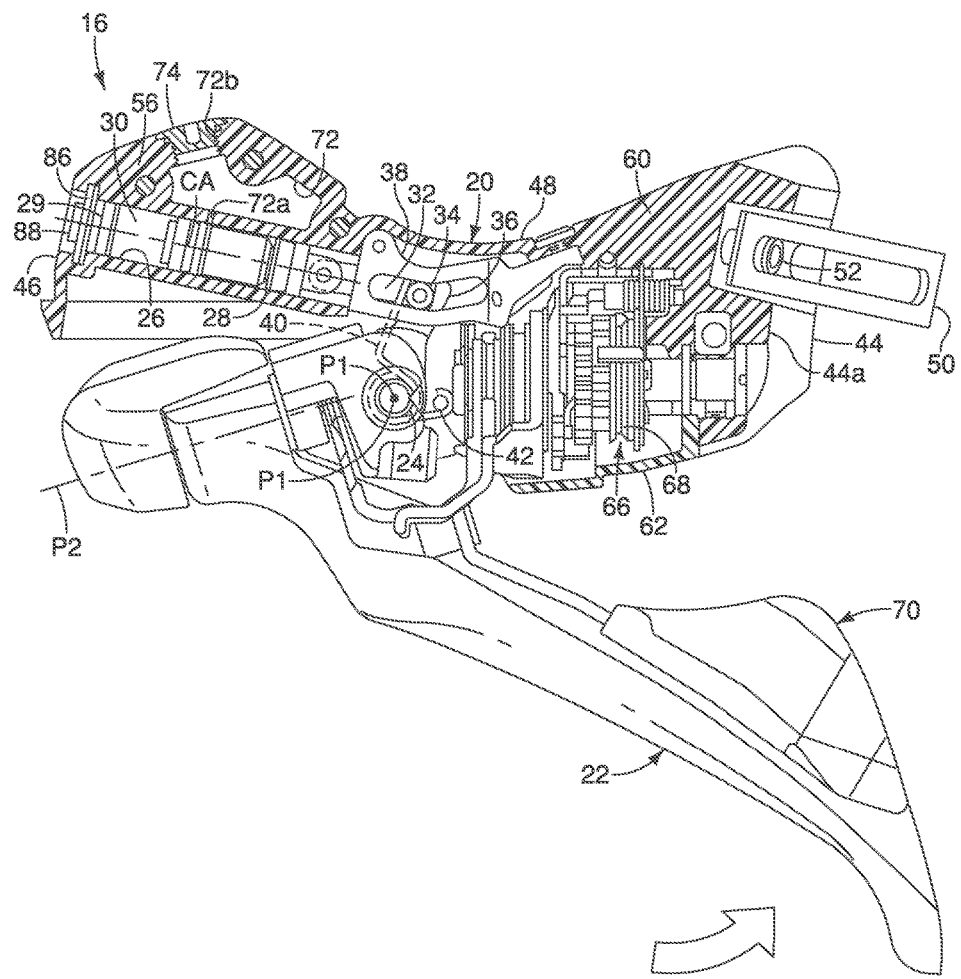
FIG. 6 is an elevational view, similar to FIG. 5, of the bicycle hydraulic device with the base member being shown in cross section and the operating member moved to a braking position.

As seen in FIGS. 5 and 6, the base member 20 includes a cylinder bore 26. The cylinder bore 26 has a cylinder axis CA. As illustrated in FIGS. 5 and 6, the cylinder bore 26 is directly formed by the base member 20. The cylinder bore 26 can be formed, for example, by cutting or die molding of the base member 20. The cylinder bore 26 is formed in a cylindrical shape. However, it will be apparent from this disclosure that a cylindrical insert can be provided to the base member 20 to form the cylinder bore 26. In this way, the cylindrical insert can be a metal tube while the base member 20 can be made of a non-metallic material.

As seen in FIGS. 5 and 6, a piston 28 is movably disposed in the cylinder bore 26 at one end of the cylinder bore 26, and a cylinder plug 29 closes off the other end of the cylinder bore 26. The piston 28, the cylinder plug 29 and the internal surface of the cylinder bore 26 define a hydraulic cylinder chamber 30. The piston 28 is operatively connected to the operating member 22 by a connecting rod 32 having a first end pivotally coupled to the piston 28 and a second end with a pair of rollers 34 (only one seen in FIGS. 5 and 6) that contact an actuation cam 36 attached to the operating member 22. The rollers 34 are each disposed in a guide slot of a guide member 38 that is fixed to the base member 20. In this way, the operating member 22 is movably mounted to the base member 20 so as to move the piston 28 in the cylinder bore 26 in response to a movement of the operating member 22. As a result, the hydraulic cylinder chamber 30 decreases in volume as the operating member 22 moves from a rest position (FIG. 5) to an actuated position (FIG. 6) in response to the pivotal movement of the operating member 22 about the pivot axis P1 to perform a braking operation. Also, as the operating member 22 moves from the rest position to the actuated position, hydraulic fluid within the hydraulic cylinder chamber 30 is pressurized and forced out of the hydraulic cylinder chamber 30 and through the hydraulic hose H2 towards the rear hydraulic disc brake caliper 18. The term "rest position" as used herein refers to a state in which the part (e.g., the operating member 22) remains stationary without the need of a user holding the part in that state corresponding to the rest position.

Here, a biasing element 40 is provided to bias the operating member 22 and the piston 28 to their rest positions as seen in FIG. 5. In the illustrated embodiment, the biasing element 40 includes a pair of torsion springs. Each of the torsion springs of the biasing element 40 has a coiled portion disposed on the pivot pin 24, a first leg portions contacting (i.e., hooked on) a post 42 fixed to the base member 20, and a second leg portion contacting one of the rollers 34.

As seen in FIGS. 5 to 10, in the illustrated embodiment, the base member 20 is a drop handlebar bracket that is mounted to a curved section of the bicycle handlebar H. The base member 20 is configured to be gripped by a user. The base member 20 includes a proximal portion 44, a distal portion 46 and a grip portion 48. Here, in the illustrated embodiment, the base member 20 is made of several pieces as discussed below. Preferably, the base member 20 is primarily made of non-metallic materials. The base member 20 is made of suitable rigid, hard materials such as hard plastic materials (e.g., resins), fiber reinforced plastic materials (e.g., fiber reinforced resins), etc.

As seen in FIG. 4, the proximal portion 44 is configured to be attached to the bicycle handlebar H. In particular, the proximal portion 44 of the base member 20 has a handlebar receiving recess 44*a* (FIGS. 5 and 6,) that is configured to receive a curved section of the bicycle handlebar H. Also, as seen in FIGS. 5 and 6, the proximal portion 44 of the base member 20 is provided with a clamping band 50 and a fastener 52 (e.g., a nut and bolt) that form a handlebar mounting structure. The handlebar mounting structure is commonly used with road brifters that are attached to a curved section of a drop handlebar Thus, the handlebar mounting structure will not be discussed or illustrated in detail herein.

The grip portion 48 is arranged between the proximal portion 44 and the distal portion 46. The grip portion 48 is configured to be gripped by a rider during riding. Preferably, as seen in FIGS. 2 and 3, the grip portion 48 is provided with a cover 54. The cover 54 is an elastic piece such as rubber that covers the outside surface of the grip portion 48. Thus, the cover 54 provides a cushion to the grip portion 48 of the base member 20 and provides an attractive appearance. The cover 54 is also often referred to as a grip cover Here, the cover 54 also partially covers a pommel 56 of the base member 20. The pommel 56 is part of the distal portion 46. The operating member 22 is mounted on the distal portion 46.

Here, in the illustrated embodiment, as seen in FIGS. 7 to 11, the base member 20 includes a main body 60. The main body 60 is one-piece member that includes the proximal portion 44, the distal portion 46, the grip portion 48 and the pommel 56. The main body 60 is made of a non-metallic material. For example, the main body 60 is made of a hard plastic material (e.g., resin) or a fiber reinforced plastic material. Here, in the illustrated embodiment, the base member 20 further includes a shift unit cover 62 and a reservoir cover 64. The shift unit cover 62 and the reservoir cover 64 are fastened to the main body 60 by fasteners such as screws. Preferably, the shift unit cover 62 and the reservoir cover 64 are made of non-metallic materials, which can be the same material used for the main body 60.

Accordingly, in the illustrated embodiment, the base member 20 supports a cable operated shift unit 66 in the grip portion 48 of the main body 60. The cable operated shift unit 66 is operated by the operating member 22 being pivoted about a pivot axis P2. In this way, pivoting of the operating member 22 pulls an inner wire of a control cable (not shown) that is connected to a wire takeup 68 of the cable operated shift unit 66. The operated shift unit 66 is also operated by an operating member 70 to release the inner wire of the control cable (not shown) that is connected to the wire takeup 68 of the cable operated shift unit 66. Here, the operating member 70 is pivotally mounted to the operating member 22 to pivot about the pivot axis P2. The cable operated shift unit 66 is constructed substantially in the same manner as the shift unit disclosed in U.S. Pat. No. 9,090,303 (assigned to Shimano, Inc.), and is operated by the operating members 22 and 70 in the same manner as disclosed in that prior U.S. patent. It will be apparent to those skilled in the bicycle field that the cable operated shift unit 66 is not limited to the illustrated structure and arrangement, but rather other suitable structures and arrangements can be used as needed and/or desired. Specifically, an electric unit including at least one electric switch can be used instead of or in addition to the cable operated shift unit 66. Since various shift unit such as the one illustrated herein are known in the bicycle field, the cable operated shift unit 66 will not be discussed herein for the sake of brevity.

Figure 9:
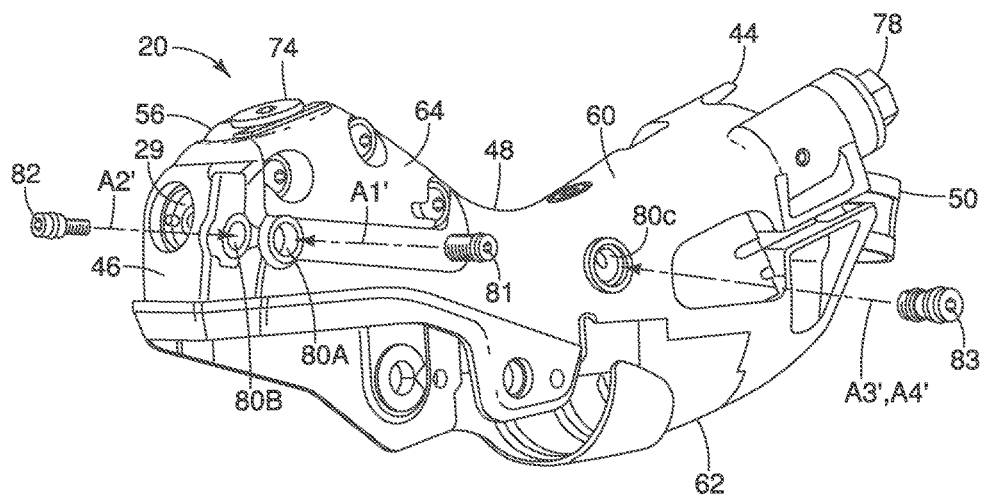
FIG. 9 is a further partial exploded perspective view of the base member of the bicycle hydraulic actuating device illustrated in FIGS. 3 to 8.
Figure 10:
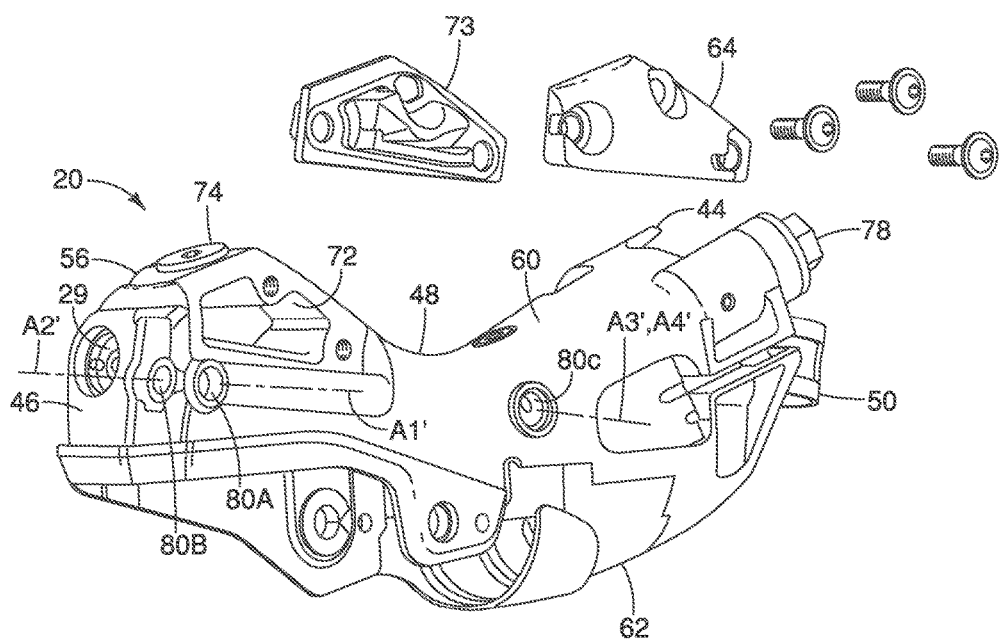
FIG. 10 is a further partial exploded perspective view of the base member of the bicycle hydraulic actuating device illustrated in FIGS. 3 to 8 with the grip cover removed.
Figure 11:
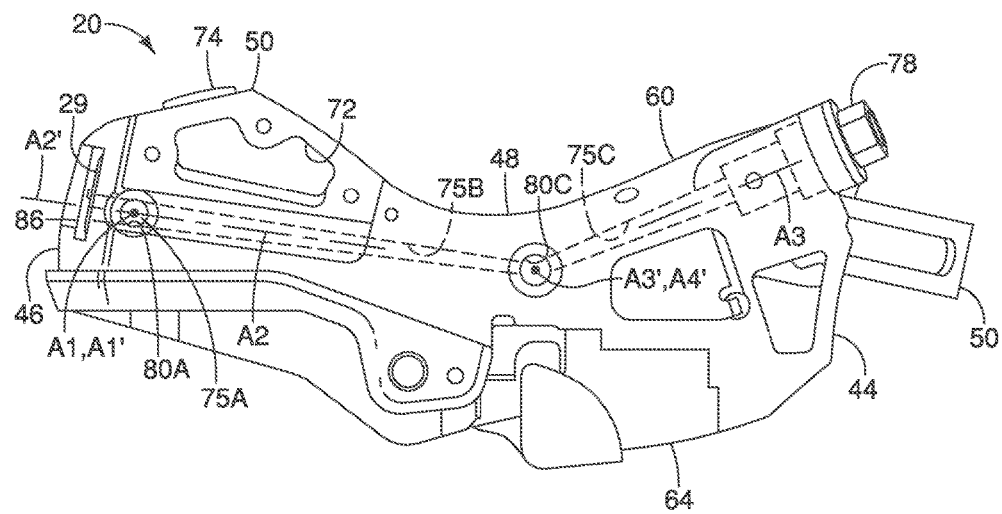
FIG. 11 is a side elevational view of the base member of the bicycle hydraulic actuating device illustrated in FIGS. 3 to 10 with the first, second, third and fourth plugs removed.

Referring to FIGS. 9 to 11, in the illustrated embodiment, the base member 20 has a built-in hydraulic reservoir tank 72 that provides hydraulic fluid to the hydraulic cylinder chamber 30 in the base member 20. The hydraulic reservoir tank 72 is fluidly connected to the cylinder bore 26 by a pair of connecting ports 72a (only one seen in FIGS. 5 and 6). The hydraulic reservoir tank 72 is provided so that the necessary amount of hydraulic fluid can be injected from the hydraulic reservoir tank 72 even if the friction material (for example, a brake pad) of the rear hydraulic disc brake caliper 18 becomes worn. In particular, the amount of hydraulic fluid needed in the hydraulic cylinder chamber 30 increase as the friction material of the rear hydraulic disc brake caliper 18 becomes worn. Also, the hydraulic reservoir tank 72 prevents inconsistencies in the pressure being applied to the braking device due to swelling and contraction caused by changes in the temperature of the hydraulic fluid. Hydraulic pressure is generated through the movement of the piston 28 in response to operation of the operating member 22.

Basically, as seen in FIG. 10, the hydraulic reservoir tank 72 has a diaphragm 73 that is at least partly disposed inside the hydraulic reservoir tank 72 and covered by the reservoir cover or lid 64. The diaphragm 73 divides the hydraulic reservoir tank 72 into an air chamber and a hydraulic fluid chamber. The hydraulic reservoir tank 72 at least partially forms the pommel portion 44 of the base member 20. The hydraulic reservoir tank 72 includes a bleed port 72b (FIGS. 5 and 6) for bleeding air from the hydraulic fluid chamber 30 and for adding hydraulic fluid to the hydraulic fluid chamber 30. The bleed port 72b is closed by a bleed screw 74. Thus, the bleed port 72b has an internal thread for screwing the bleed screw 74 into the bleed port 72b.

Figure 12:
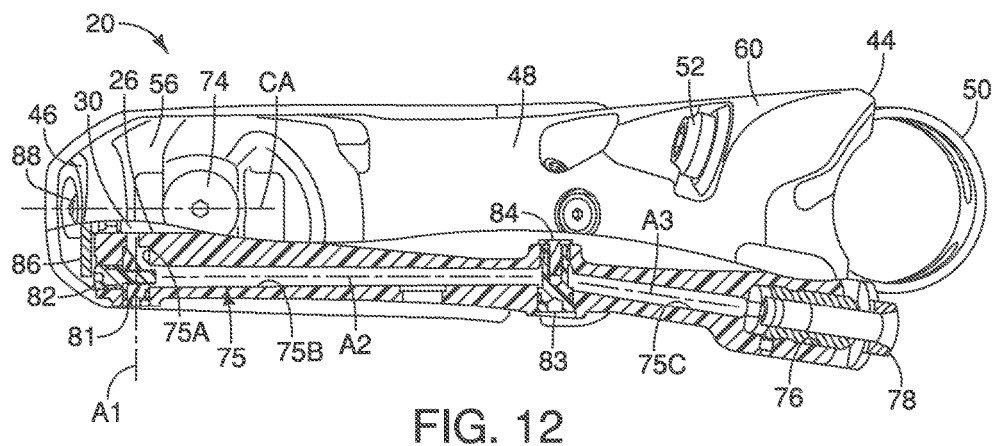
FIG. 12 is a top view of the base member of the bicycle hydraulic actuating device illustrated in FIGS. 3 to 10 with a portion of a main body of the base member broken away.

Here, in the illustrated embodiment, as seen in FIGS. 11 and 12, the main body 60 of the base member 20 includes a hydraulic fluid passageway 75. The hydraulic fluid passageway 75 is fluidly connected to the cylinder bore 26. The hydraulic fluid passageway 75 extends from the cylinder bore 26 to an outlet port 76. The outlet port 76 is configured to receive a hydraulic hose connector 78 of the hydraulic hose H2 In this way, the hydraulic fluid passageway 75 fluidly connects the hydraulic cylinder chamber 30 to the hydraulic hose H2. In the illustrated embodiment, the hydraulic fluid passageway 75 includes a first fluid channel 75A and a second fluid channel 75B. The first fluid channel 75A fluidly connects the cylinder bore 26 and the second fluid channel 75B.

The first fluid channel 75A has a first center axis A1. The second fluid channel 75B has a second center axis A2 The first center axis A1 extends substantially perpendicular between the second center axis A2 and the cylinder axis CA. The second center axis A2 is substantially parallel to the cylinder axis CA The first and second center axes A1 and A2 of the first and second fluid channels 75A and 75B intersect to form an angle θ1 therebetween.

In the illustrated embodiment, the hydraulic fluid passageway 75 further includes a third fluid channel 75C having a third center axis A3. The second and third center axes A2 and A3 of the second and third fluid channels 75B and 75C intersect to form an angle θ2 therebetween. Since the main body 60 is preferably made of a one-piece member, it is difficult to form the hydraulic fluid passageway 75 due to the non-linear shape formed by the first, second and third fluid channels 75A. 75B and 75C. In the illustrated embodiment, each of the first, second and third fluid channels 75A, 75B and 75C are linear bores that are formed in the main body 60 of the base member 20 by, for example, die molding, cutting and/or drilling. Thus, as seen in FIGS. 10 and 11, to make the first and second fluid channels 75A and 75B, the base member 20 has a first opening 80A and a second opening 80B. The first opening 80A communicates with the hydraulic fluid passageway 75. In particular, the first opening 80A directly communicates with the first fluid channel 75A of the hydraulic fluid passageway 75. The second opening 80B communicates with the hydraulic fluid passageway 75. In particular, the second opening 80B directly communicates with the second fluid channel 75B of the hydraulic fluid passageway 75. The third fluid channel 75C is made via the outlet port 76. However, to ensure a good fluid connection between the second and third fluid channels 75B and 75C, the base member 20 has a third opening 80C which communicates with the hydraulic fluid passageway 75 at the intersection between the second and third fluid channels 75B and 75C. The base member 20 has a fourth opening 80D (FIG. 14) which communicates with the hydraulic fluid passageway 75 at the intersection between the second and third fluid channels 75B and 75C.

Figure 13:
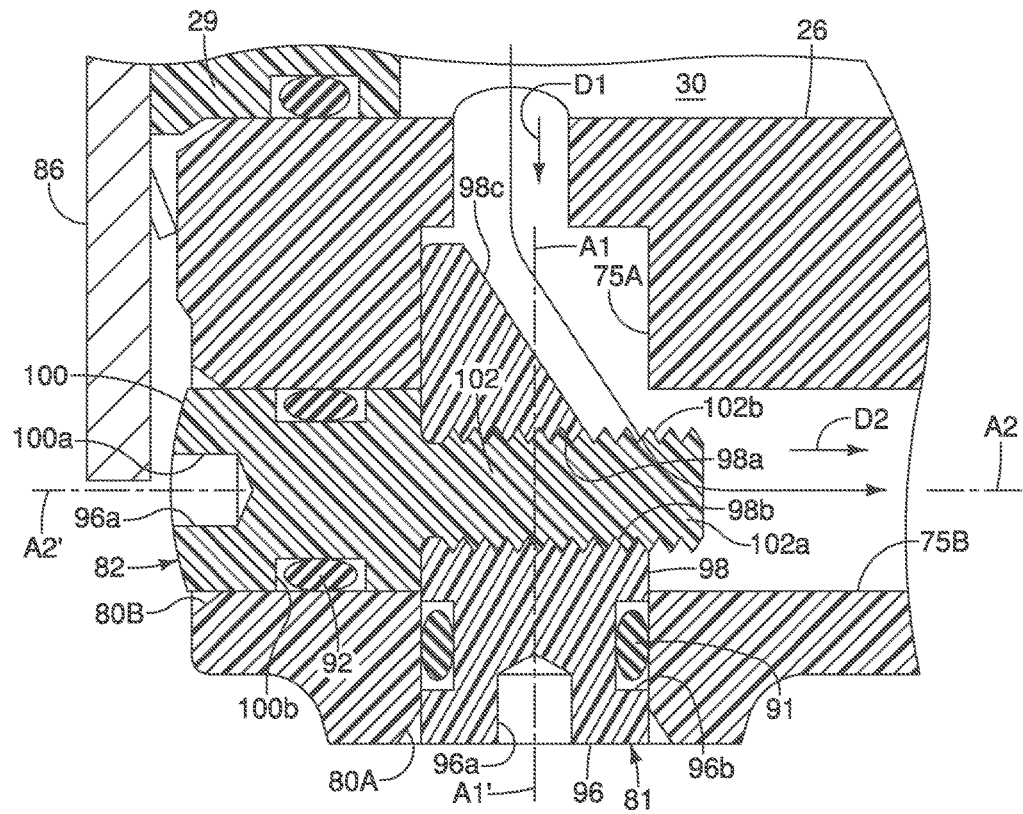
FIG. 13 is an enlarged partial cross sectional view of the base member and the first and second plugs illustrated in FIG. 12.
Figure 14:
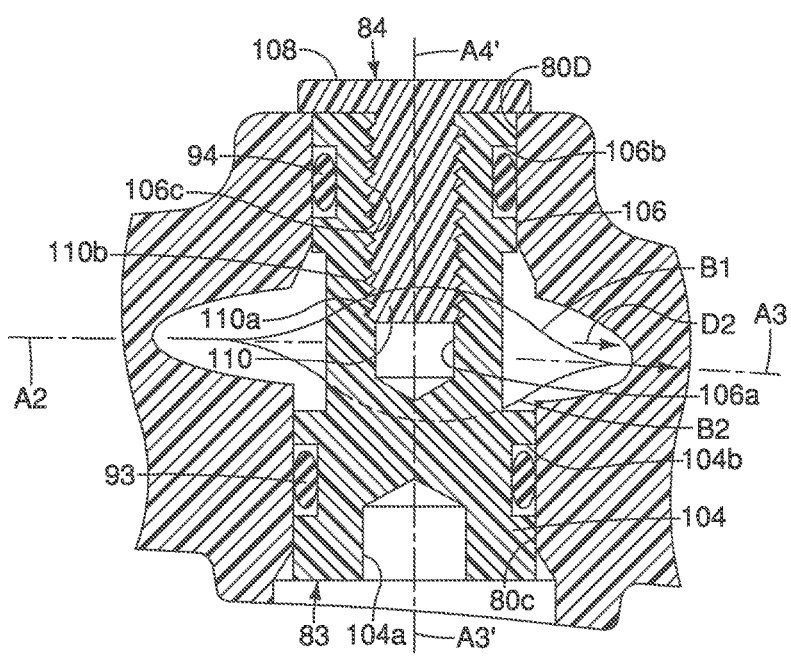
FIG. 14 is an enlarged partial cross sectional view of the base member and the third and fourth plugs illustrated in FIG. 12.

As seen in FIGS. 12 to 14, the main body 60 of the base member 20 comprises a first plug 81, a second plug 82, a third plug 83 and a fourth plug 84. Due the shape of the hydraulic fluid passageway 75, the main body 60 of the base member 20 has four plugs closing off four openings that were formed while forming the first, second and third fluid channels 75A, 75B and 75C. However, the shape of the hydraulic fluid passageway 75 could be changed in which case only two openings are formed. If only two openings are formed that need to be closed off then two of the first, second, third and fourth plugs 81, 82, 83 and 84 could be omitted. If the first and second plugs 81 and 82 are omitted, then the third and fourth plugs 83 and 84 can be considered as the first and second plugs of the appended claims.

The first plug 81 is made of a non-metallic material. The first plug 81 is disposed in the first opening 80A of the base member 20. The first opening 80A defines a first insert axis A1' along which the first plug 81 is inserted. Here, the first insert axis A1' of the first plug 81 is axially align with the first center axis A1 of the first fluid channel 75A.

As seen in FIG. 13, the second plug 82 is disposed in the second opening 80B of the base member 20. The second plug 82 is made of a non-metallic material. The second opening 80B defines a second insert axis A2' along which the second plug 82 is inserted. Here, the second insert axis A2' of the second plug 82 is axially align with the second center axis A2 of the second fluid channel 75B. Thus, the first and second insert axes A1' and A2 form the angle θ1 therebetween.

Preferably, the first and second openings 80A and 80B are arranged such that at least one of the first and second insert axes A1' and A2 is different from a fluid flow direction D1 of the hydraulic fluid exiting the hydraulic cylinder chamber 30 in response to operation of the operating member 22. Here, the first plug 81 is arranged perpendicular to the fluid flow direction D1. Thus, the first insert axes A1' is different from the fluid flow direction D1 in the illustrated embodiment.

Figure 7:
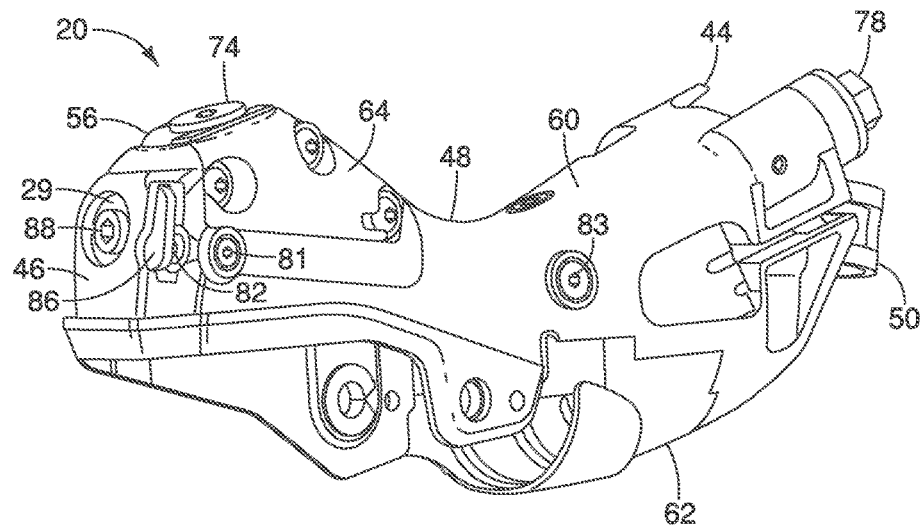
FIG. 7 is a perspective view of the base member of the bicycle hydraulic actuating device illustrated in FIGS. 3 to 6.
Figure 8:
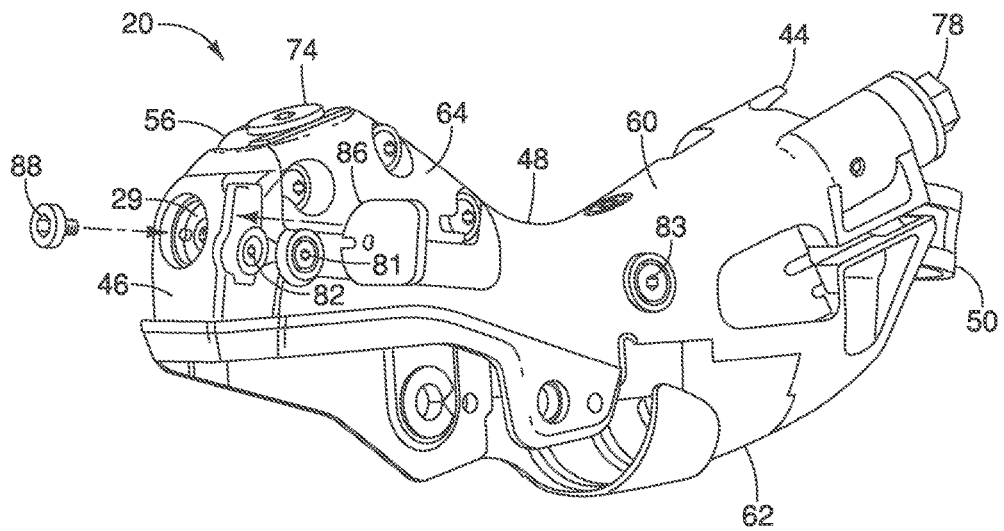
FIG. 8 is a partial exploded perspective view of the base member of the bicycle hydraulic actuating device illustrated in FIGS. 3 to 7.

As seen in FIGS. 7 and 8, a blocking member 86 is attached to the base member 20 by a screw 88 to prevent the second plug 82 from coming out of the base member 20. In particular, the blocking member 86 is a plate that is located in a slot of base member 20 and overlies the second plug 82. The screw 88 is screwed into the cylinder plug 29.

As seen in FIG. 14, the third plug 83 is disposed in the third opening 80C of the base member 20. The third plug 83 is made of a non-metallic material. The third and fourth plugs 83 and 84 are disposed at an intersection of the second and third fluid channels 75B and 75C to divide the hydraulic fluid passageway 75 into two fluid flow branches 131 and B2 The third opening 80C defines a third insert axis A3' along which the third plug 83 is inserted. Here, the third insert axis A3' of the third plug 83 is perpendicular to the second and third center axes A2 and A3 of the second and third fluid channels 75B and 75C.

The fourth plug 84 is disposed in the fourth opening 80D of the base member 20. The fourth plug 84 is made of a non-metallic material. The fourth opening 80D defines a fourth insert axis A4' along which the fourth plug 84 is inserted. The third and fourth insert axes A3' and A4' are coaxial. Here, the fourth insert axis A4' of the fourth plug 84 is perpendicular to the second and third center axes A2 and A3 of the second and third fluid channels 75B and 75C. Thus, the third and fourth openings 80C and 80D are arranged such that the third and fourth insert axes A3' and A4' both are perpendicular to a fluid flow direction D2 of the hydraulic fluid flowing through hydraulic fluid passageway 75 at the intersection of the second and third fluid channels 75B and 75C in response to operation of the operating member 22.

In the illustrated embodiment, as seen in FIG. 13, a first seal 91 is disposed between the first plug 81 and the base member 20, and a second seal 92 is disposed between the second plug 82 and the base member 20. In this way, hydraulic fluid is prevented from leaking out of the first and second openings 80A and 80B. Here, the first and second seals are O-rings that are made of an elastomeric material such as a rubber material. Likewise, as seen in FIG. 14, third and fourth seals 93 and 94 are disposed between the third plug 83 and the base member 20 and between the fourth plug 84 and the base member 20 respectively to prevent hydraulic fluid from leaking out of the third and fourth openings 80C and 80D.

As seen in FIG. 13, the first plug 81 includes a plug portion 96 with a tool receiving recess 96a and a seal receiving recess 96b. The tool receiving recess 96a is configured to receive a tool such as an Allen (hex) key for turning the first plug 81 to the proper orientation. The seal receiving recess 96b receives the first seal 91. The first plug 81 further includes a fixing portion 98. The fixing portion 98 of the first plug 81 has a receiving hole 98a. The receiving hole 98a of the first plug 81 includes an internal thread 98b. The first plug 81 further includes a slanted surface 98c that is disposed in the hydraulic fluid passageway 75 at an intersection of the first and second fluid channels 75A and 75B The slanted surface 98c is angled with respect to the first and second center axes A1 and A2.

As seen in FIG. 13, the second plug 82 includes a plug portion 100 with a tool receiving recess 100a and a seal receiving recess 100b. The tool receiving recess 100a is configured to receive a tool such as an Allen (hex) key for turning the second plug 82 for fixing the second plug 82 to the first plug 81 as explained below. The seal receiving recess 100b receives the second seal 92. The second plug 82 further includes a fixing portion 102. The fixing portion 102 of the second plug 82 has a protrusion 102a that extends into the receiving hole 98a of the first plug 81 to couple the first and second plugs 81 and 82 to the base member 20. The protrusion 102a of the second plug 82 includes an external thread 102b that is threadedly engaged with the internal thread 98b. Thus, the first and second plugs 81 and 82 are fixed together by first inserting the first plug 81 into the first fluid channel 75A, and then inserting and screwing the second plug 82 so that the external thread 102b of the protrusion 102a threadedly engage the internal thread 98b of the receiving hole 98a. In addition, the first and second plugs 81 and 82 can be fixed to the main body 60 by bonded connections which can be adhesive or laser welding if needed and/or desired.

As seen in FIG. 14, the third plug 83 includes a first plug portion 104 and a second plug portion 106. The first plug portion 104 has a tool receiving recess 104a and a first seal receiving recess 104b. The tool receiving recess 104a is configured to receive a tool such as an Allen (hex) key for turning the third plug 83 for fixing the third plug 83 to the fourth plug 84 as explained below. The first seal receiving recess 104b receive the third seal 93. The second plug portion 106 also acts as a fixing portion. The second plug portion 106 of the third plug 83 has a receiving hole 106a. The second plug portion 106 of the third plug 83 also has a second seal receiving recess 106b that receives the fourth seal 94. The receiving hole 106a includes an internal thread 106c.

As seen in FIG. 14, the fourth plug 84 includes a head portion 108 that is configured to be engaged a tool such as wrench for holding and/or turning the fourth plug 84 for fixing the fourth plug 84 to the third plug 83 as explained below. The fourth plug 84 further includes a fixing portion 110. The fixing portion 110 of the fourth plug 84 has a protrusion 110a that extends into the receiving hole 106a of the third plug 83 to couple the third and fourth plugs 83 and 84 to the base member 20. The protrusion 110a of the fourth plug includes an external thread 110b that is threadedly engaged with the internal thread 106b. When the guide member 38 is fixed to the base member 20, the guide member 38 acts as a blocking member similar to the blocking member 86 to prevent the fourth plug 84 from coming out unscrewed from the third plug 83. In addition, the third and fourth plugs 83 and 84 can be fixed to the main body 60 of the base member 20 by bonded connections which can be adhesive or laser welding if needed and/or desired.

Figure 15:
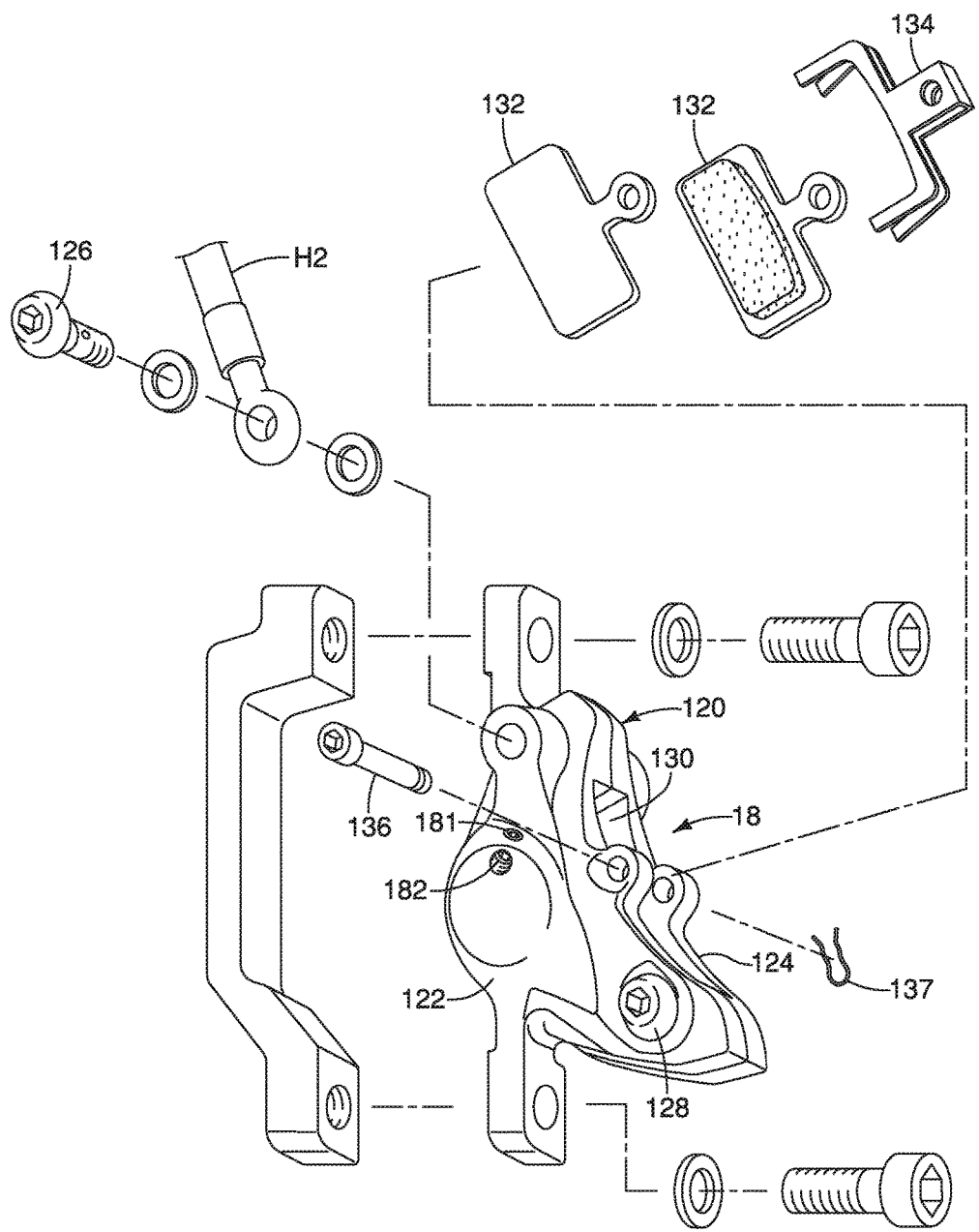
FIG. 15 is a partially exploded perspective view of the bicycle hydraulically actuated device that is actuated by the bicycle hydraulic actuating device illustrated in FIGS. 2 to 7.
Figure 16:
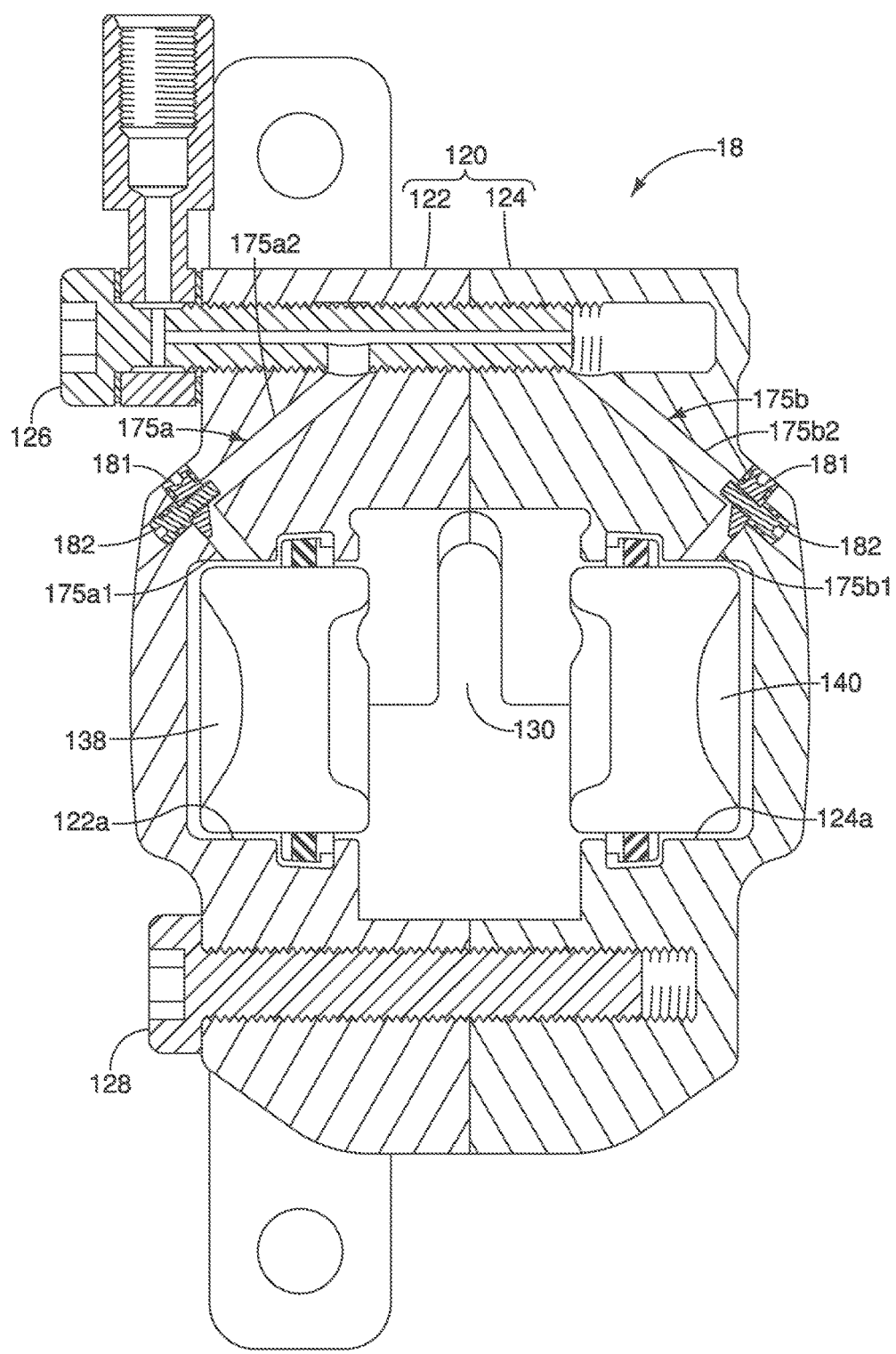
FIG. 16 is enlarged partial cross sectional view of the bicycle hydraulically actuated device illustrated in FIG. 15.

Referring to FIGS. 2, 15 and 16, the rear hydraulic disc brake caliper 18 will now be discussed. The rear hydraulic disc brake caliper 18 is configured to engages a brake rotor R in a conventional manner for slowing the rotation or stopping a bicycle wheel (not shown) that is equipped with the brake rotor R. As seen in FIG. 2, the rear hydraulic disc brake caliper 18 includes a base member or caliper housing 120 that is mounted to a rear part of the frame body FB in a conventional manner. Thus, in the case of the rear hydraulic disc brake caliper 18, the base member is a caliper housing. Here, the caliper housing 120 includes a first caliper part 122 and a second caliper part 124. The first and second caliper parts 122 and 124 are fixedly connected together by a banjo bolt 126 and a fixing bolt 128 in a conventional manner to form a caliper housing with a brake disc slot 130.

As seen FIG. 15, the rear hydraulic disc brake caliper 18 further includes a pair of brake pads 132 and a biasing member 134. A pad axle or pin 136 is provided for mounting the brake pads 132 and the biasing member 134 in a brake disc slot 130. The pad axle or pin 136 is retained to the first and second caliper parts 122 and 124 with a spring clip 137 in a conventional manner. Thus, the brake pads 132 are movable mounted on the pad axle 136 between the first and second caliper parts 122 and 124 in a conventional manner. The biasing member 134 is a metal member that is disposed between the brake pads 132 to bias the brake pads 132 out of engagement with the disc brake rotor R in a conventional manner.

Each of the first and second caliper parts 122 and 124 of the caliper housing 120 includes a piston receiving cavity 122a and 124a in which pistons 138 and 140 are movably disposed to move the brake pads 132. The first caliper part 122 of the caliper housing 120 includes a hydraulic fluid passageway 175a that is fluidly connected to the piston receiving cavity 122a. The second caliper part 124 of the caliper housing 120 includes a hydraulic fluid passageway 175b that is fluidly connected to the piston receiving cavity 124a. While the rear hydraulic disc brake caliper 18 includes a pair of movable pistons 138 and 140, it will be apparent to those skilled in the bicycle field from this disclosure that the rear hydraulic disc brake caliper 18 can have one non-movable piston and only one movable piston if needed and/or desired.

In the illustrated embodiment, the hydraulic fluid passageway 175a includes a first fluid channel 175a1 and a second fluid channel 175a2, while the hydraulic fluid passageway 175b includes a first fluid channel 175b1 and a second fluid channel 175b2. The hydraulic fluid passageways 175a and 175b are form in a similar manner to the first fluid channel 75A and a second fluid channel 75B of the hydraulic fluid passageway 75 as discussed above. Thus, the first and second caliper parts 122 and 124 of the caliper housing 120 are each provided with a first plug 181 and a second plug 182. The first and second plugs 181 and 182 are identical to the first and second plugs 81 and 82. The first and second plugs 181 and 182 will not be discussed in detail herein.

Figure 17:
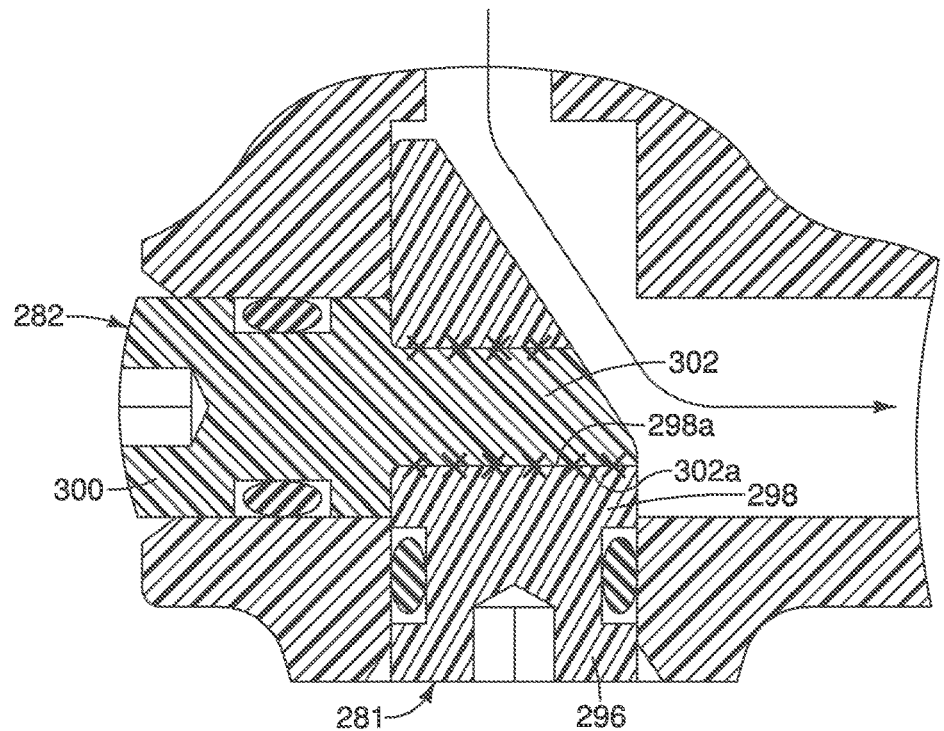
FIG. 17 is an enlarged partial cross sectional view of the base member and the first and second plugs illustrated in FIG. 12.

Referring to FIG. 17, modified first and second plugs 281 and 282 are illustrated that are identical to the first and second plugs 81 and 82 and the first and second plugs 181 and 282, except that the threaded connection has been replaced with a bonded connection and the second plug 282 has been shortened. The modified first and second plugs 281 and 282 can be used with either the rear shift/brake operating device 16 (the bicycle hydraulic device) or the rear hydraulic disc brake caliper 18 (the bicycle hydraulic device). The first plug 281 includes a plug portion 296 and a fixing portion 298. The fixing portion 298 has a non-threaded receiving hole 298a. The second plug 282 includes a plug portion 300 and a fixing portion 302. The fixing portion 302 has a protrusion 302a that extends into the receiving hole 298a of the first plug 281. The protrusion 302a is bonded within the receiving hole 298a by a bonded connection (illustrated as a series of x's) therebetween. The bonded connection can be adhesive or laser welding.

Figure 18:
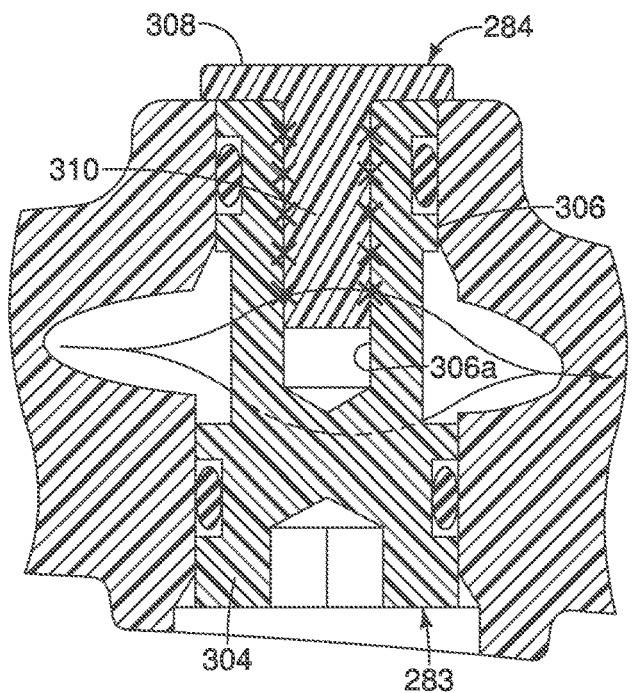
FIG. 18 is an enlarged partial cross sectional view of the base member and the third and fourth plugs illustrated in FIG. 12.

Referring to FIG. 18, modified third and fourth plugs 283 and 284 are illustrated that are identical to the third and fourth plugs 83 and 84, except that the threaded connection has been replaced with a bonded connection. The modified third and fourth plugs 283 and 284 can be used with either die rear shift/brake operating device 16 (the bicycle hydraulic device) or the rear hydraulic disc brake caliper 18 (the bicycle hydraulic device). The third plug 283 includes a first plug portion 304 and a second plug portion 306. The second plug portion 306 has a non-threaded receiving hole 306a. The fourth plug 183 includes a head portion 308 and a fixing portion 310. The fixing portion 310 has a protrusion 310a that extends into the receiving hole 306a of the third plug 283. The protrusion 310a is bonded within the receiving hole 306a by a bonded connection (illustrated as a series of x's) therebetween. The bonded connection can be adhesive or laser welding.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic device. Accordingly, these directional terms, as utilized to describe the bicycle hydraulic device should be interpreted relative to a bicycle in an upright riding position on a horizontal surface and that is equipped with the bicycle hydraulic device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic device comprising:
   a base member having a hydraulic fluid passageway, a first opening communicating with the hydraulic fluid passageway and a second opening communicating with the hydraulic fluid passageway;
   a first plug disposed in the first opening, and having a receiving hole; and
   a second plug disposed in the second opening, and having a protrusion extending into the receiving hole of the first plug to couple the first and second plugs to the base member.

2. The bicycle hydraulic device according to claim 1, wherein
   the receiving hole of the first plug includes an internal thread, and the protrusion of the second plug includes an external thread that is threadedly engaged with the internal thread.

3. The bicycle hydraulic device according to claim 1, wherein
   the protrusion of the first plug is bonded within the receiving hole of the second plug by a bonded connection therebetween.

4. The bicycle hydraulic device according to claim 1, further comprising
   a first seal disposed between the first plug and the base member; and
   a second seal disposed between the second plug and the base member.

5. The bicycle hydraulic device according to claim 1, wherein
   the first opening defines a first insert axis along which the first plug is inserted, the second opening defines a second insert axis along which the second plug is inserted.

6. The bicycle hydraulic device according to claim 5, wherein
   the first and second insert axes form an angle therebetween.

7. The bicycle hydraulic device according to claim 5, wherein
   the first and second insert axes are coaxial.

8. The bicycle hydraulic device according to claim 5, wherein
   the first and second openings are arranged such that at least one of the first and second insert axes is different from a fluid flow direction.

9. The bicycle hydraulic device according to claim 8, wherein
   the first and second openings are arranged such that the first and second insert axes both are perpendicular to the fluid flow direction.

10. The bicycle hydraulic device according to claim 1, wherein
    the hydraulic fluid passageway includes a first fluid channel having a first center axis and a second fluid channel having a second center axis, the first and second center axes of the first and second fluid channels intersect to form an angle therebetween, and
    the first plug includes a slanted surface that is disposed in the hydraulic fluid passageway at an intersection of the first and second fluid channels, the slanted surface is angled with respect to the first and second center axes.

11. The bicycle hydraulic device according to claim 10, further comprising
    a third plug disposed in a third opening of the base member which communicates with the hydraulic fluid passageway, and the third plug having a receiving hole; and
    a fourth plug disposed in a fourth opening of the base member which communicates with the hydraulic fluid passageway, and the fourth plug having a protrusion extending into the receiving hole of the third plug to couple the third and fourth plugs to the base member.

12. The bicycle hydraulic device according to claim 11, wherein
    the hydraulic fluid passageway includes a third fluid channel having a third center axis, the second and third center axes of the second and third fluid channels intersect to form an angle therebetween, and
    the third and fourth plugs are disposed at an intersection of the second and third fluid channels to divide the hydraulic fluid passageway into two fluid flow branches.

13. The bicycle hydraulic device according to claim 1, wherein
    the base member includes a main body that includes the hydraulic fluid passageway, the main body is made of a non-metallic material.

14. The bicycle hydraulic device according to claim 1, wherein
    the first and second plugs are each made of a non-metallic material.

15. The bicycle hydraulic device according to claim 1, wherein
    the base member includes a cylinder bore in which a piston is movably disposed, the hydraulic fluid passageway includes a first fluid channel and a second fluid channel, the first fluid channel fluidly connecting the cylinder bore and the second fluid channel.

16. The bicycle hydraulic device according to claim 15, wherein the cylinder bore has a cylinder axis, the first fluid channel has a first center axis, and the second fluid channel has a second center axis that is substantially parallel to the cylinder axis.

17. The bicycle hydraulic device according to claim 16, wherein the first center axis extends substantially perpendicular between the second center axis and the cylinder axis.

18. The bicycle hydraulic device according to claim 1, further comprising an operating member movably mounted to the base member that includes a cylinder bore so as to move a piston disposed in the cylinder bore in response to a movement of the operating member, the hydraulic fluid passageway being fluidly connected to the cylinder bore.

19. The bicycle hydraulic device according to claim 18, wherein the base member includes a proximal portion configured to be attached to a bicycle handlebar, a distal portion, and a grip portion arranged between the proximal portion and the distal portion, and the operating member is mounted on the distal portion.

20. The bicycle hydraulic device according to claim 1, wherein the base member is a caliper housing that includes a piston receiving cavity in which a piston is movably disposed to move a brake pad, the hydraulic fluid passageway is fluidly connected to the piston receiving cavity.

* * * * *